United States Patent [19]

Reach, Jr.

[11] Patent Number: 4,805,594
[45] Date of Patent: Feb. 21, 1989

[54] TUBE MAT FOR SOLAR COLLECTOR

[75] Inventor: Robert L. Reach, Jr., York Town Heights, N.Y.

[73] Assignee: Delford Industries, Inc., Middletown, N.Y.

[21] Appl. No.: 149,390

[22] Filed: Jan. 28, 1988

[51] Int. Cl.$^4$ .............................. F24J 2/36; F24J 2/24
[52] U.S. Cl. ................................... 126/426; 126/448; 24/399
[58] Field of Search ................ 24/399; 126/426, 442, 126/448

[56] References Cited

U.S. PATENT DOCUMENTS

| 2,353,858 | 7/1944 | Tedesco | 24/399 |
| 2,914,936 | 12/1959 | Reinold | 24/399 X |
| 3,848,298 | 11/1974 | Frohlich | 24/399 X |
| 4,176,654 | 12/1979 | Zinn et al. | 126/448 |

FOREIGN PATENT DOCUMENTS

| 2711058 | 9/1978 | Fed. Rep. of Germany | 126/448 |
| 3122391 | 12/1982 | Fed. Rep. of Germany | 126/426 |
| 2059049A | 4/1981 | United Kingdom | 126/448 |

Primary Examiner—Samuel Scott
Assistant Examiner—Allen J. Flanigan
Attorney, Agent, or Firm—Charles E. Baxley

[57] ABSTRACT

A tube mat for a solar collector is comprised of a plurality of identical tube strips each in turn formed with a plurality of parallel longitudinally extending tubes including two edge tubes at opposite longitudinal edges of the strip and inner tubes between the edge tubes and respective longitudinally extending webs transversely interconnecting the inner tubes and connecting the edge tubes to the inner tubes along their full lengths with all of the tubes lying in a plane. Thus each edge tube has an inner edge joined by the respective web to the adjacent inner tube and an opposite outer edge. A respective U-section flexible seal is provided on each edge tube. Each seal has an inner lip joined to the outer edge of the respective edge tube along the full length thereof and an outer edge spaced outward therefrom and defining with the respective inner lip a longitudinally extending groove open perpendicular to the plane of the strip. These grooves of the seals are generally complementary to the outer lips and open oppositely from the strip plane. As a result the outer leg of the seal at one edge of a strip can be engaged in the groove of the seal of the outer tube of an adjacent strip to join these two strips together along their full lengths.

3 Claims, 1 Drawing Sheet

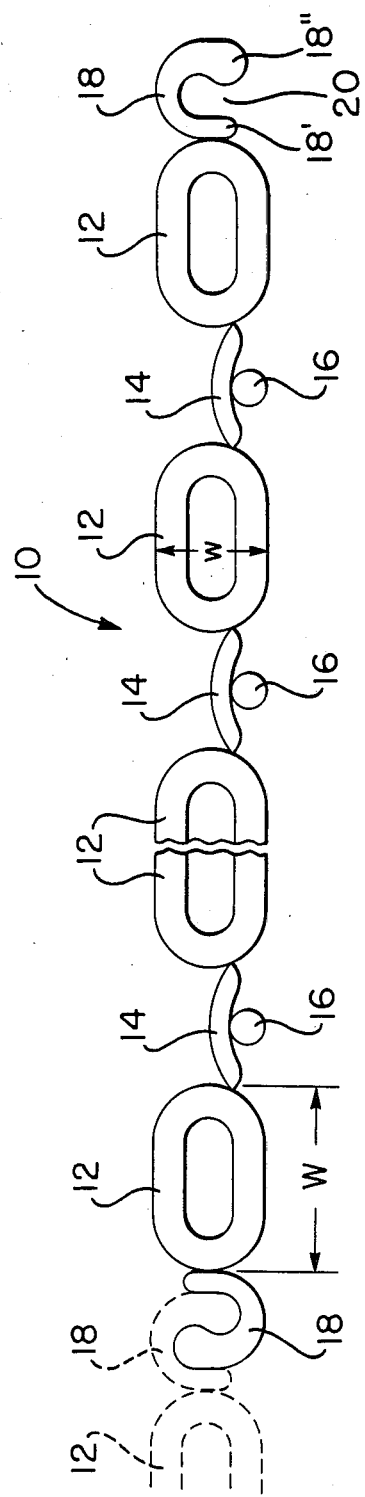
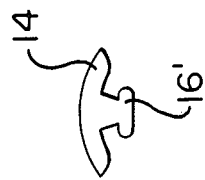
FIG. 1
FIG. 2 ously at any desired location between the centers of two tubes 12. Thus it is possible to cut the strip 10 to any desired width, since these webs 14 do not contain any fluid, and indeed it is even possible to slit one of the tubes 12 longitudinally and flatten it out.

TUBE MAT FOR SOLAR COLLECTOR

FIELD OF THE INVENTION

The present invention relates to a solar collector. More particularly this invention concerns a tube mat used in such a collector.

BACKGROUND OF THE INVENTION

As described in U.S. Pat. No. 4,176,654 of Zinn, it is known to make a tube mat of a solar collector from a plurality of individual tube strips each formed by a group of parallel flexible tubes joined laterally to one another at spaced-apart locations along their lengths. The tubes may be of oval or flattened section and may be interconnected by flat webs.

In such an arrangement it is standard to connect every other tube at one end of the mat to an intake manifold and to connect the remaining alternate tubes at this one end to an output manifold, while at the opposite mat end U-shaped shunts connect alternate tubes together. Such an arrangement is typically cemented atop a bed of insulation on a roof within an insulating curb, and a transparent cover is provided above the tube mat to protect the tubes from the elements and afford further insulation.

While the use of such a tube mat substantially eases the work of installing a solar collector on a roof or similar surface by making it possible to provide a collector of virtually any desired size, cut to fit on the job, it still has some disadvantages. In particular, although the tubes are connected together to one another within each strip, it is necessary to position adjacent strips—as each such strip is rarely more than, say, 8 in wide—very carefully to avoid the cement that adheres them to the support surface from oozing up between adjacent strips. As a result of this problem, the tendency is to make the strips as wide as possible to reduce the number of longitudinally extending joints in a single mat. Such increase in width in part reduces the adaptability of the basic tube-mat strip to collectors of different widths, it being necessary to use a certain rather wide basic modular width.

OBJECTS OF THE INVENTION

It is therefore an object of the present invention to provide an improved tube mat for a solar collector.

Another object is the provision of such a tube mat for a solar collector which overcomes the above-given disadvantages, that is whose individual strips can be joined transversely together to form a leak-proof longitudinally extending joint between adjacent strips.

SUMMARY OF THE INVENTION

A tube mat for a solar collector is comprised of a plurality of identical tube strips each in turn formed with a plurality of parallel longitudinally extending tubes including two edge tubes at opposite longitudinal edges of the strip and inner tubes between the edge tubes and with respective longitudinally extending webs transversely interconnecting the inner tubes and connecting the edge tubes to the inner tubes along their full lengths with all of the tubes lying in a plane. Thus each edge tube has an inner edge joined by the respective web to the adjacent inner tube and an opposite outer edge. According to this invention a respective U-section flexible seal is provided on each edge tube. Each seal has an inner lip joined to the outer edge of the respective edge tube along the full length thereof and an outer edge spaced outward therefrom and defining with the respective inner lip a longitudinally extending groove open perpendicular to the plane of the strip. These grooves of the seals are generally complementary to the outer lips and open oppositely from the strip plane. As a result the outer leg of the seal at one edge of a strip can be engaged in the groove of the seal of the outer tube of an adjacent strip to join these two strips together along their full lengths.

With the system of this invention, therefore, the strips can be joined together along their full lengths at a physically strong and leakproof joint that is assembled with no need for special tools or a mastic. The resilience of the resin used to make the tube strip is sufficient to ensure a watertight fit. A mat constructed in this manner can be cemented down without any possibility of the mastic oozing up between adjacent tube strips, as in the prior-art system.

According to another feature of this invention each outer lip is formed with a bead that is snugly and elastically engageable in the groove of another such seal. As a result the connection formed by these seals is quite robust.

The webs of the tube strip of this invention are of generally uniform wall thickness and generally U-shaped with faces concave all in the same direction perpendicular from the respective strip plane. This shape causes the strip to lie flat, even after it has been rolled up for quite some time, reducing the difficulties in adhering it to a flat surface. This tendency to lie flat and the overall strength of the tube strip is increased by providing a filament joined to each web along the full length of the concave face thereof. Instead of the filament the web can be formed on its concave face with a full-length ridge of inverted T-section and having a central downwardly tapering leg.

DESCRIPTION OF THE DRAWING

The above and other objects, features, and advantages will become more apparent from the following, reference being made to the accompanying drawing in which:

FIG. 1 is an end view of a tube strip according to the present invention; and

FIG. 2 is a view of a detail of a variant of the system of FIG. 1, again shown in end view.

SPECIFIC DESCRIPTION

As seen in FIG. 1 a tube strip 10 for forming a tube mat according to this invention is formed by six identical flattened tubes 12 each having a width dimension W measured in the plane of the strip 10 that is equal to between 0.372 in and 0.422 in and a width w measured perpendicular to this plane of between 0.218 in and 0.258 in, with a wall thickness of between 0.055 in and 0.081 in. These tubes 12 are joined together by part-cylindrical webs 14 that are concave and that space the tubes 12 transversely apart by between 0.225 in and 0.275 in, these webs 14 having a wall thickness of 0.027 in to 0.053 in and a radius of curvature of about 0.208 in. This curvature counters any tendency of the tube strip 10 to roll up or assume the shape it has when wound up on a spool prior to use. Since the strip is extruded and allowed to cure when straight, it will naturally assume such a straight shape even after having been rolled up due to the arcuate shape of the webs 16.

Thus the tubes 12 are on centers equal to between 0.597 in and 0.697 in. For reinforcement purposes the concave side of each web 14 is provided with a circular-section filament 16 of a diameter between 0.060 in and 0.086 in. These parts 12, 14, and 16 are all unitarily formed of a durable sun-resistant synthetic resin, for instance ethylene propylene diene monomer or terpolymer.

As shown in FIG. 2 it is possible to use, instead of the filament 16, a rib 16' of inverted T-section, having an upstanding leg joined to the web 14 and tapering downward from a width of 0.72 in at its upper end to a width of 0.032 in at its lower end. Once again this rib or ridge 16' is integrally formed with the web 14 of the same material and serves to hold the tube mat flat when laid down.

According to this invention the tube 12 at each longitudinal edge of the strip 10 is provided with a snap-action flexible seal 18 which may be formed unitarily of the same EPDM resin as the balance of the collector strip 10. Each of the seals is of U-section and has a thin leg 18' joined to the respective edge tube 12 and an opposite leg 18" formed with a bead. Together the legs 18' and 18" therefore form a groove 20 that is substantially complementary in shape to the thick leg 18". Each seal 18 has a width measured in the plane of the collector strip equal to 0.188 in to 0.228 in and each thin leg 18' has a wall thickness of 0.027 in to 0.053 in.

Thus assuming that the tubes 12 and the webs 14 are mid-sized so as to be 0.647 in on center and that the seals 18 are similarly mid sized, when two such strips 10 are joined together as illustrated in dot-dash lines to the left in the drawing the tubes 12 at the edges of the two strips 10 will be spaced apart by the same distance as the rest of the tubes 12 in each strip 10. In other words the overall width of two interfitted seals 18 is substantially equal to the width of one of the webs 14.

It is therefore possible to join the tube strips according to this invention along their full longitudinal lengths, and in fact it is possible to provide appropriate formations on the edge of the curb into which the thus formed tube mat will fit to engage in the outermost seals. Since the strips will be joined along their entire lengths, the cement applied to the support surface underneath them cannot possibly ooze up between adjacent strips, and in fact the seal of this invention is constructed to be generally watertight so as to provide a further degree of protection for the underlying surface.

What is claimed is:

1. A tube mat for a solar collector, the tube mat being comprised of a plurality of identical tube strips each formed with:

a plurality of parallel longitudinally extending tubes including two edge tubes at opposite longitudinal edges of the strip and inner tubes between the edge tubes;

respective longitudinally extending webs transversely interconnecting the inner tubes and connecting the edge tubes to the inner tubes along their full lengths with all of the tubes lying in a plane, whereby each edge tube has an inner edge joined by the respective web to the adjacent inner tube and an opposite outer edge;

a respective U-section flexible seal having an inner lip joined to the outer edge of each edge tube along the full length thereof and an outer edge spaced outward therefrom and defining with the respective inner lip a longitudinally extending groove open perpendicular to the plane of the strip, the grooves of the seals being generally complementary to the outer lips and opening oppositely from the strip plane, whereby the outer leg of the seal at one edge of a strip can be engaged in the groove of the seal of the outer tube of an adjacent strip to join these two strips together along their full lengths, wherein the webs are of generally uniform wall thickness and generally U-shaped and have faces concave all in the same direction perpendicular from the respective strip plane.

2. The tube mat defined in claim 1, further comprising a filament joined to each web along the full length of the concave face thereof.

3. The tube mat defined in 1 wherein each web is provided on its concave face with a full-length ridge of inverted T-section.

* * * * *